(12) United States Patent
Grinko

(10) Patent No.: US 9,393,631 B2
(45) Date of Patent: Jul. 19, 2016

(54) METHOD FOR HARD FINE MACHINING OF A WORKPIECE WITH A WORM-SHAPED CUTTING TOOL

(71) Applicants: KAPP Werkzeugmaschinen GmbH, Coburg (DE); NILES Werkzeugmaschinen GmbH, Berlin (DE)

(72) Inventor: Sergiy Grinko, Coburg (DE)

(73) Assignees: KAPP WERKZEUGMASCHINEN GMBH, Coburg (DE); NILES WERKZEUGMASCHINEN GMBH, Berlin (DE)

( * ) Notice: Subject to any disclaimer, the term of this patent is extended or adjusted under 35 U.S.C. 154(b) by 16 days.

(21) Appl. No.: 14/658,669

(22) Filed: Mar. 16, 2015

(65) Prior Publication Data

US 2015/0290730 A1    Oct. 15, 2015

(30) Foreign Application Priority Data

Apr. 9, 2014    (DE) .......................... 10 2014 005 274

(51) Int. Cl.
  *B23F 19/05*    (2006.01)
  *B23F 23/00*    (2006.01)
  (Continued)

(52) U.S. Cl.
  CPC .................. *B23F 19/052* (2013.01); *B23F 5/04* (2013.01); *B23F 5/22* (2013.01); *B23F 15/08* (2013.01); *B23F 23/006* (2013.01); *B23Q 23/00* (2013.01)

(58) Field of Classification Search
  CPC ........ B23F 19/052; B23F 5/04; B23F 23/006; B23F 23/1225; B23F 5/02; B23F 19/04; B23F 9/025; B23F 19/05; B23Q 23/00
  See application file for complete search history.

(56) References Cited

U.S. PATENT DOCUMENTS 3,203,313 A * 8/1965 Uhrmeister ............... B23F 5/22
                                                         318/632
3,897,661 A * 8/1975 Inatomi ..................... B23F 5/04
                                                         451/148

(Continued)

FOREIGN PATENT DOCUMENTS

EP    1600236 A1    11/2005
EP    1600236 B1    11/2005

(Continued)

OTHER PUBLICATIONS

European Search Report dated Sep. 8, 2015 for European Application No. 15000866.2-1702.

*Primary Examiner* — George Nguyen
(74) *Attorney, Agent, or Firm* — Lucas & Mercanti, LLP

(57) ABSTRACT

A method for hard fine machining of a workpiece with a worm-shaped cutting tool, wherein the workpiece has a profiling along its circumference. The cutting tool has a machining surface. A hard machining process of the profiling is carried out at simultaneous synchronized rotation of the workpiece around its axis and of the cutting tool around its axis with given meshing of the machining surface into the profiling by moving the cutting tool in the direction of the axis of the cutting tool. A shift movement is superposed to the cutting tool in the direction of the axis of the cutting tool during the hard machining. The shift movement includes at least one first section at which the cutting tool is moved in one of its axial directions and of at least one second section at which the cutting tool is moved in the other of its axial directions.

10 Claims, 3 Drawing Sheets

(51) Int. Cl.
*B23F 5/04* (2006.01)
*B23F 5/22* (2006.01)
*B23F 15/08* (2006.01)
*B23Q 23/00* (2006.01)

(56) References Cited

U.S. PATENT DOCUMENTS

| | | | | |
|---|---|---|---|---|
| 4,329,096 A | * | 5/1982 | Herscovici | B23F 5/205 |
| | | | | 318/561 |
| 4,744,179 A | * | 5/1988 | Mockli | B23F 5/04 |
| | | | | 409/12 |
| 5,624,301 A | * | 4/1997 | Lenz | B23F 1/026 |
| | | | | 451/21 |
| 7,682,222 B2 | | 3/2010 | Baldeck | |
| 8,087,974 B2 | * | 1/2012 | Maeda | B23F 11/00 |
| | | | | 451/147 |
| 8,147,296 B2 | | 4/2012 | Lopez | |
| 2010/0261415 A1 | * | 10/2010 | Wawro | B23F 19/00 |
| | | | | 451/47 |
| 2013/0244546 A1 | * | 9/2013 | Mueller | B23F 5/04 |
| | | | | 451/47 |

FOREIGN PATENT DOCUMENTS

| | | |
|---|---|---|
| EP | 1987919 A2 | 11/2008 |
| JP | H0615527 A | 1/1994 |
| JP | H10286720 A | 10/1998 |
| WO | 2007139708 A2 | 12/2007 |

* cited by examiner

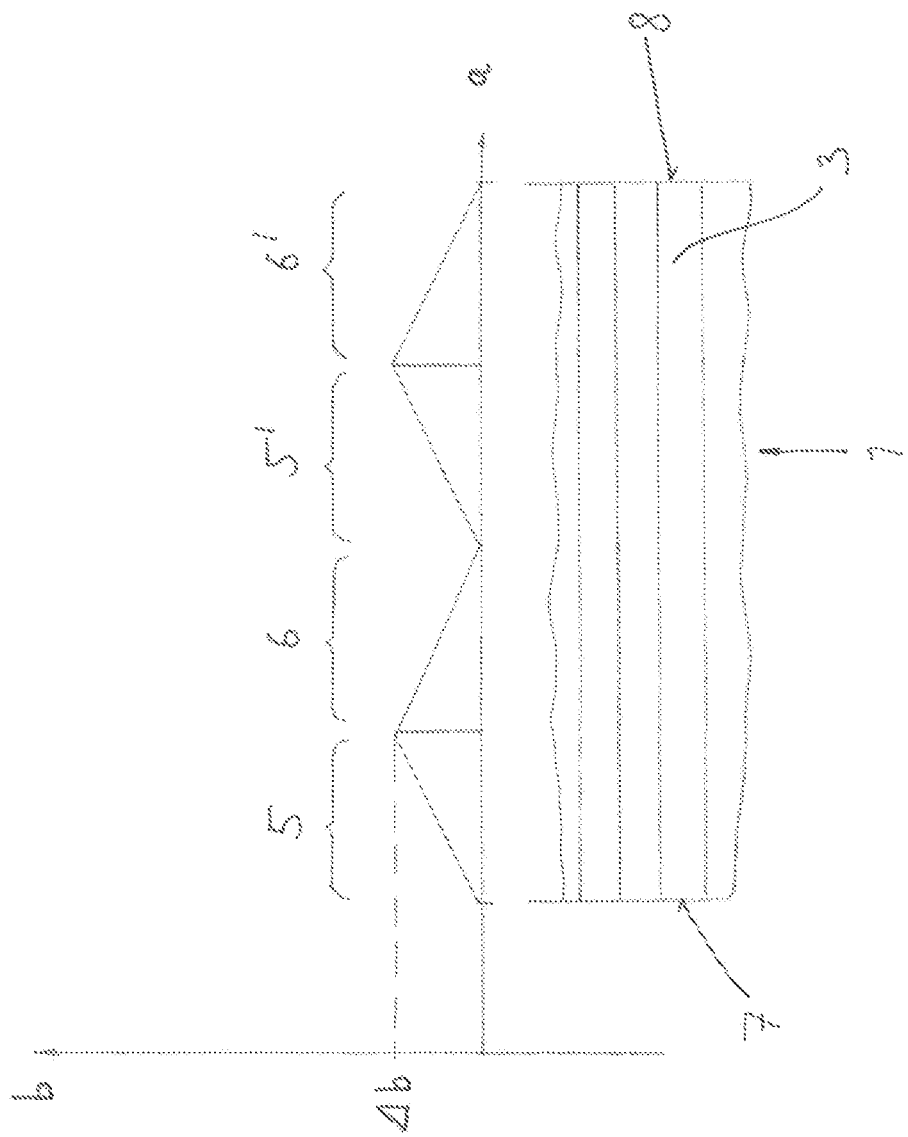

METHOD FOR HARD FINE MACHINING OF A WORKPIECE WITH A WORM-SHAPED CUTTING TOOL

CROSS-REFERENCE TO RELATED APPLICATIONS

The present application claims priority of 10 2014 005 274.5, filed Apr. 9, 2014, the priority of this application is hereby claimed and this application is incorporated herein by reference.

BACKGROUND OF THE INVENTION

The invention relates to a method for hard fine machining of a workpiece with a worm-shaped cutting tool, wherein the workpiece comprises an axis and is supplied with a profiling along its circumference, wherein the cutting tool comprises an axis and is supplied with a machining surface, wherein a hard machining process of the profiling is carried out at simultaneous synchronized rotation of the workpiece around its axis and of the cutting tool around its axis with given meshing of the machining surface into the profiling by moving the cutting tool in the direction of the axis of the cutting tool and wherein a shift movement is superposed to the cutting tool in the direction of the axis of the cutting tool during the hard machining process.

At hard fine finishing, particularly of gears, the grinding with a grinding worm is well known in the state of the art. It is referred to EP 1 987 919 A2 in an exemplarily way, where a grinding worm is described to the mentioned purpose. Herewith a continuous grinding process takes place (in contrast to the discontinuous grinding of the individual tooth gap of the gear which has to be grinded), wherein the grinding worm meshes with the gear which has to be grinded and the gear and the grinding worm rotate relatively to another in a correlating manner with the appropriate infeed.

Thereby, at generative grinding of a toothing and a profile respectively it can be provided that the grinding worm is displaced (so called "shifting") in its axial direction during the machining (i. e. while the worm is guided in axial direction of the gear with a respective infeed) to compensate the wear of the grinding worm. The electronic gearbox of the grinding machine, which ensures the precise synchronized rotation between the grinding worm and the workpiece, guarantees thereby the coupling of the volution, taking into account the planned and programmed shift movement.

For each workpiece a defined worm region of the grinding worm is provided at the machining. From this results the number of parts to be grinded between two dressing processes. Normally, the mentioned shift amount is calculated in such a manner that all parts between two dressing processes (i. e. the parts per dressing) correspond to the required quality and that a maximal productivity is obtained.

At the grinding without the mentioned shifting respectively at shifting with low shift amounts a regular structure is formed at the flank surface of the teeth of the gear, wherein the grinding marks run parallel to another along the whole width of the workpiece. Such a structure influences negatively the noise behavior during meshing of the gear pairs in the gearbox. To improve the noise behavior methods have been developed which modify the surface structure so that the parallel running grinding marks are interrupted or do not exist anymore at all. The surface structure is then characterized by the offset arrangement of the grinding marks in the direction of the profile.

In EP 1 600 236 B1 another approach is used at which the movement of the workpiece along the tooth width is chosen unequally.

WO 2007/139708 A2 describes a solution at which by shifting different axial regions of a grinding worm are brought into contact to compensate modifications in the diameter of the grinding worm caused by wear. Also, JP H06 15527 A employs a shift movement of a grinding tool to use the tool life in an optimal manner.

All pre-known methods are either laborious or do not deliver the desired effect.

SUMMARY OF THE INVENTION

Thus, it is an object of the invention to further develop a method for hard fine machining of a workpiece with a work-shaped cutting tool of the generic kind in such a manner that a better result is obtained. Accordingly, an improved noise behavior during the operation of the workpiece should be reached.

The solution of this object by the invention is characterized in that the shift movement consists of at least one first section at which the cutting tool is moved in one of the directions of its axis and consists of at least one second subsequent section at which the cutting tool is moved in the other of its directions of its axis.

According to one embodiment of the invention the shift movement consists of a single first section at which the cutting tool is moved in one of the directions of its axis and consists of a single second section at which the cutting tool is moved in the other of the directions of its axis.

Another embodiment of the invention provides that the shift movement consists at first of a first section at which the cutting tool is moved in one of the directions of its axis and that the shift movement consists of a subsequent second section at which the cutting tool is moved in the other of the directions of its axis, wherein subsequently at least one further first section follows at which the cutting tool is moved in one of the directions of its axis and at least one further second section at which the cutting tool is moved in the other of the directions of its axis.

Accordingly, it can be provided that more than two of those regions, each consisting of the movement of the cutting tool firstly in one of the directions and then in the other of the directions, follows subsequently, for example six or eight sections.

It can also be provided that the number of partial sections is odd-numbered, thus for example three, five or seven partial sections follow subsequently.

The length of the single (partial) sections is mostly equal; but it can also be provided that the length of the sections is unequal.

Thereby, the shift movements within the first and second sections can be linear runs of the movement in the direction of the axis of the cutting tool over the run of the axis of the workpiece.

Alternatively, it is also possible that the shift movements within the first and second sections are sinusoidal runs of the movement in the direction of the axis of the cutting tool over the run of the axis of the workpiece.

Also other functional runs are possible, for example ramp-like runs or a combination of different forms of courses.

The positions of the cutting tool along its axis are preferably equal at the beginning of the machining process in one of the axial end regions of the workpiece and at the end of the machining process in the other axial end region of the workpiece.

The workpiece is preferably a gear and the profiling is then the toothing of the gear. Thereby, the gear is preferably an exterior toothed gear.

But the workpiece can also comprise another profile, for example it can be a rotor with an exterior profiling.

The hard fine machining process is preferably a grinding process, wherein a grinding worm is used as the cutting tool.

The proposed method allows to modify the surface structure on the tooth flank (in the case of a gear) by a special shift process in an efficient and nevertheless simple manner and thereby to improve the noise behaviour of the gear during the later operation.

Additionally, the productivity of the grinding with noise reducing shifting is sufficiently increased.

With the proposed method a shifting of the grinding tool can be carried out in a simple manner and thereby a positive influence of the flank surface can be obtained.

The proposed method constitutes a beneficial finish machining of gears and similar profiles.

Accordingly, due to the invention the finish machining of gears and similar profiles is characterized in that at the generative grinding the grinding worm is displaced (thus "shifted") by a certain amount in axial direction so that the grinding marks on the tooth flank surface are not continuous any more.

Thereby, the direction of the movement of the shifting is changed once or several times. So, regions are created on the tooth flank which show structures of different direction.

The mentioned change of the direction (reversal of the shifting movement) can occur in regular but also in irregular distances along the width of the workpiece which also influences the size of the regions as well as the structure of the regions respectively.

The shifting and feed rate speed can be kept constant or variable in those shift regions.

The reversal of the shift movement during the machining results also in a reduction of the total shift movement per stroke. This has a positive influence on the number of parts per dressing and that means an increase of the productivity respectively. So, the dressing time per part and consequently the pro rata tool costs per part are reduced beneficially.

The various features of novelty which characterize the invention are pointed out with particularity in the claims annexed to and forming a part of the disclosure. For a better understanding of the invention, its operating advantages, specific objects attained by its use, reference should be had to the drawings and descriptive matter in which there are illustrated and described preferred embodiments of the invention.

BRIEF DESCRIPTION OF THE DRAWING

In the drawing:

FIG. 2 shows the course of a shift displacement movement which is superposed to the grinding worm during grinding of the gear as a function of the feed motion of the grinding worm along the width of the gear according to a first embodiment of the invention (below the course of the function the position of the gear which has to be ground is depicted) and FIG. 3 shows in the depiction according to FIG. 2 an alternative embodiment of the invention.

DETAILED DESCRIPTION OF THE INVENTION

Figure 1:
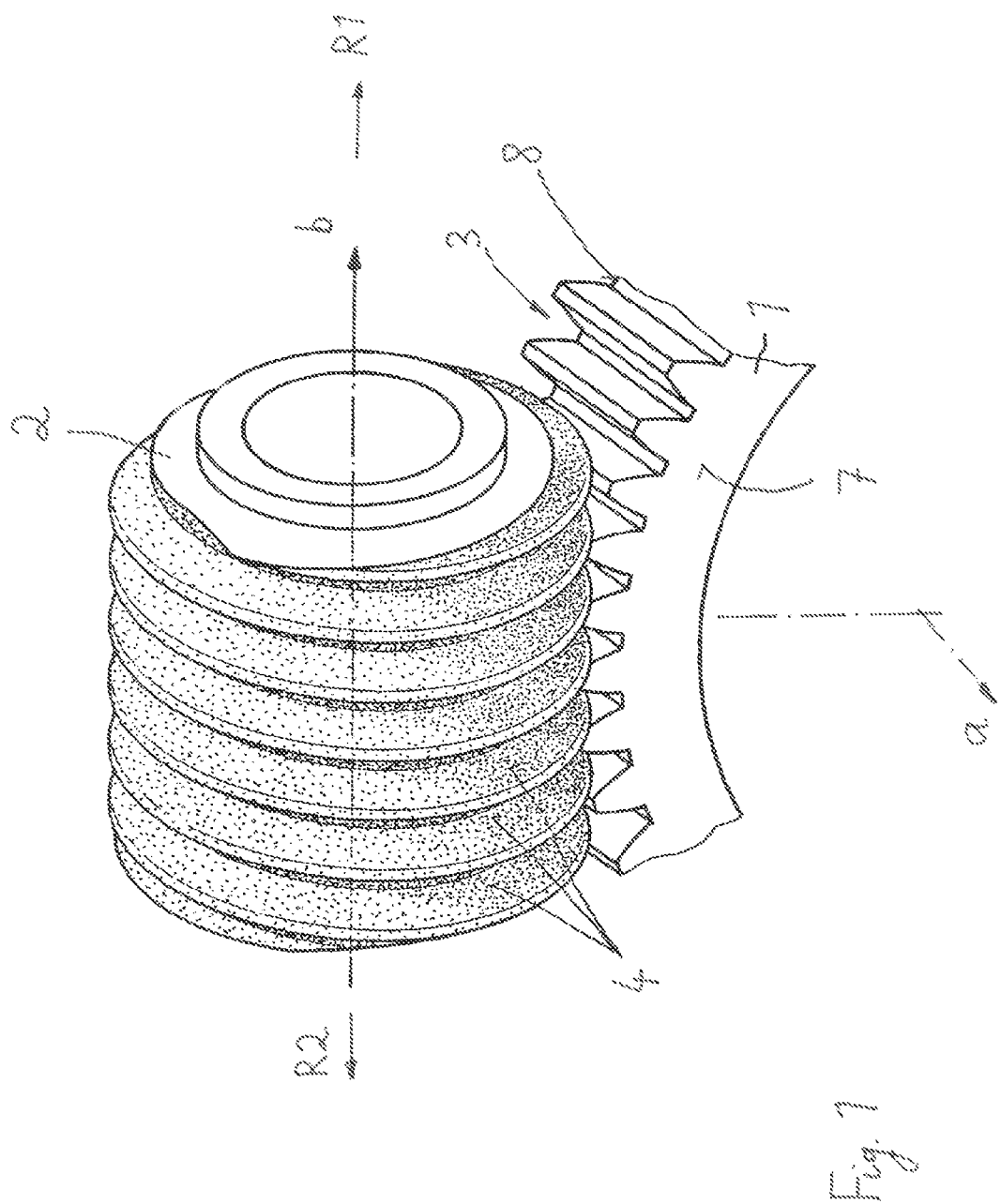
FIG. 1 shows in a perspective view a part of a gear which meshes with a grinding worm for hard fine machining the toothing of the gear.

In FIG. 1 a workpiece 1 in the form of a gear is shown which comprises a profiling in the form of a toothing. To grind this toothing 3, thus to hard fine finishing the same, a worm-shaped cutting tool 2 in the form of a grinding worm is provided. The tool 2 has a machining surface 4.

During the grinding the gear 1 rotates around its axis a and the tool 2 around its axis b. To machine the gear 1 and namely the toothing 3 along the whole width of the tooth from one axial end region 7 to the other axial end region 8 not only the rotation around the respective axes is carried out during the mesh of the tool 2 into the workpiece 1 but a relative movement takes place between the workpiece 1 and the tool 2 in the direction of the axis a.

At conventional shifting—for the purpose of compensation of wear of the tool 2—it can be proceeded in such a manner that the grinding worm 2 is shifted during one stroke (movement between the two axial end regions 7, 8 of the gear 1 and the toothing 3 respectively) only in one direction (e. g. in the direction R1, see FIG. 1).

However, the proposed method proposes another approach: In fact, also here a shift movement in the direction of the axis b of the tool 2 takes place, however a reversal of the direction occurs now along the width of the toothing. Generally spoken, the shift movement consists of at least one first section 5 at which the cutting tool 2 is moved in the first direction R1 of its axis b and of at least a second section 6 at which the cutting tool 2 is moved in the other direction R2 of its axis. This is shown in FIG. 2.

In this embodiment is can be seen that the grinding worm is shifted in the first direction (R1, see FIG. 1) from the start of the stroke (starting in the axial end section 7 of the workpiece 1) to the middle of the stroke. Then, from the middle of the stroke to the end of the stroke (ending in the axial end section 8 of the workpiece 1) a shifting in the counter direction R2 (see FIG. 1) occurs so that the whole amount of shifting is halved.

Figure 2:
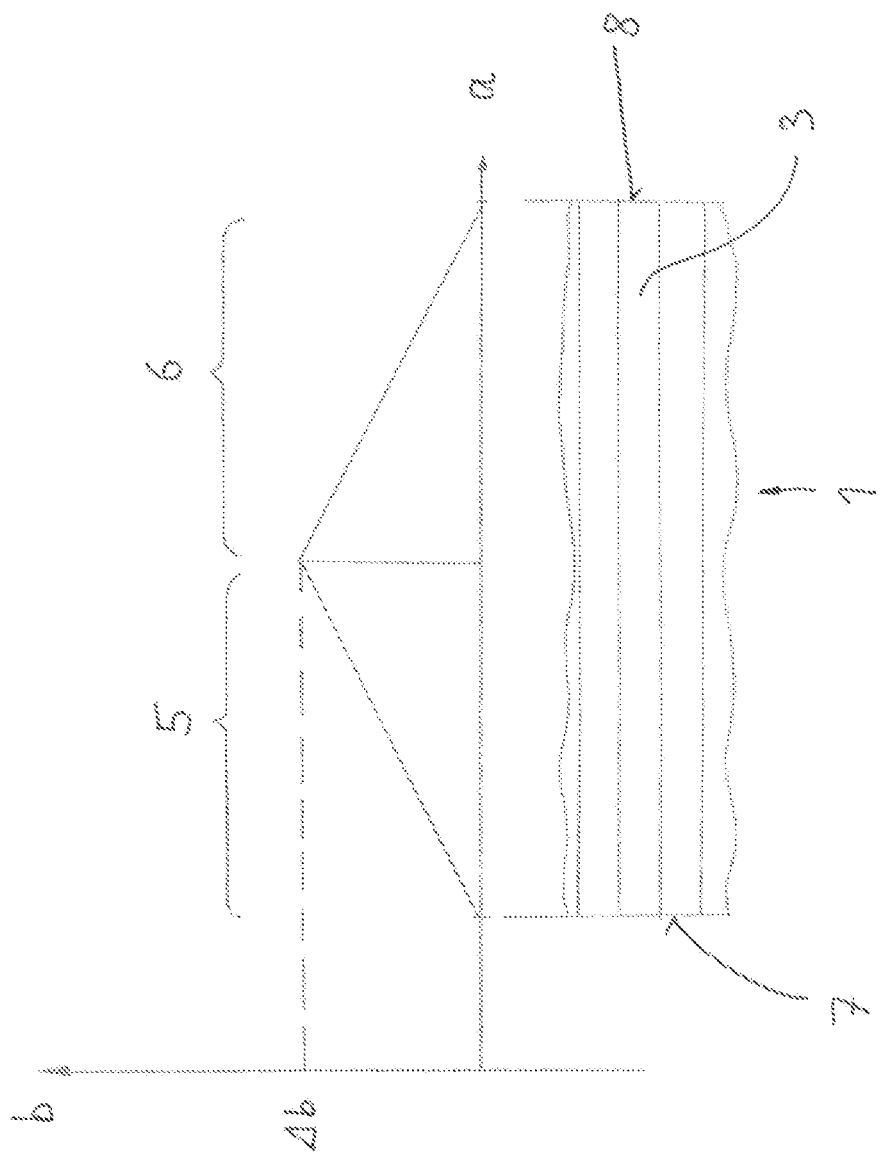

Thereby, in this embodiment a linear run of the shift movement is provided (see the ramp-shaped course of the function in FIG. 2). However, of course also other courses of the function can be provided.

A refinement of this principle is depicted in FIG. 3. Here, it is provided that the grinding worm 2 is shifted from the beginning of the stroke to a quarter of the stroke in the one direction R1 (first section 5) and then from the quarter of the stroke to the middle of the stroke in the counter direction R2 (second section 6); afterwards, the worm is shifted from the middle of the stroke to three quarters of the stroke again in the one direction R1 (first section 5') and from three quarters of the stroke to the end of the stroke again in the counter direction R2 (second section 6').

In this case the double ramp function is created as can be seen in FIG. 3. Of course, also here again other courses of the function can be provided.

The maximal amount of shifting which is provided in the two embodiments according to FIGS. 2 and 3 is denoted with b.

While specific embodiments of the invention have been shown and described in detail to illustrate the inventive principles, it will be understood that the invention may be embodied otherwise without departing from such principles.

I claim:

1. A method for hard fine machining of a workpiece with a worm-shaped cutting tool, wherein the workpiece comprises an axis and with a profiling along its circumference, wherein the cutting tool comprises an axis and a machining surface, the method comprising the steps of:
   carrying out a hard machining process of the profiling with simultaneous synchronized rotation of the workpiece around its axis and of the cutting tool around its axis with given meshing of the machining surface into the profiling by moving the cutting tool in a direction of the axis of the cutting tool; and superposing a shift movement to the cutting tool in a direction of the axis of the cutting tool during the hard machining process, wherein the shift movement includes at least one first section in which the cutting tool is moved in one of the directions of its axis and includes at least one second section in which the cutting tool is moved in the other of direction of its axis.

2. The method according to claim 1, wherein the shift movement consists of a single first section in which the cutting tool is moved in one of the directions of its axis and that the shift movement consists of a single second section in which the cutting tool is moved in the other of the directions of its axis.

3. The method according to claim 1, wherein the shift movement includes, at first, a first section in which the cutting tool is moved in one of the directions of its axis and the shift movement includes a subsequent second section in which the cutting tool is moved in the other of the directions of its axis, wherein, subsequently, at least one further first section follows in which the cutting tool is moved in one of the directions of its axis and at least one further second section in which the cutting tool is moved in the other of the directions of its axis.

4. The method according to claim 1, wherein, within the first and second sections, the shift movements are linear runs of the movement in the direction of the axis of the cutting tool over the run of the axis of the workpiece.

5. The method according to claim 1, wherein, within the first and second sections, the shift movements are sinusoidal runs of the movement in the direction of the axis of the cutting tool over the run of the axis of the workpiece.

6. The method according to claim 1, wherein positions of the cutting tool along its axis are equal at a beginning of the machining process in one of the axial end regions of the workpiece and at an end of the machining process in the other axial end region of the workpiece.

7. The method according to claim 1, wherein the workpiece is a gear and the profiling is the toothing of the gear.

8. The method according to claim 7, wherein the gear is an exterior toothed gear.

9. The method according to claim 1, wherein the workpiece is a rotor with an exterior profiling.

10. The method according to claim 1, wherein the hard fine machining process is a grinding process and a grinding worm is used as the cutting tool.

\* \* \* \* \*